United States Patent
Uchiba et al.

(10) Patent No.: US 10,703,313 B2
(45) Date of Patent: Jul. 7, 2020

(54) VEHICLE BODY STRUCTURE

(71) Applicants: Mazda Motor Corporation, Aki-gun, Hiroshima (JP); Y-Tec Corporation, Aki-gun, Hiroshima (JP)

(72) Inventors: Yuuki Uchiba, Hiroshima (JP); Atsushi Kawamoto, Hiroshima (JP); Hiroto Kido, Aki-gun (JP); Yasushi Ishikawa, Hiroshima (JP); Daisuke Kanamaru, Hatsukaichi (JP); Susumu Sano, Kure (JP); Hokuto Mukai, Higashihiroshima (JP); Yasunari Jinbo, Aki-gun (JP)

(73) Assignees: MAZDA MOTOR CORPORATION, Aki-Gun, Hiroshima (JP); Y-TEC CORPORATION, Aki-Gun, Hiroshima (JP)

( * ) Notice: Subject to any disclaimer, the term of this patent is extended or adjusted under 35 U.S.C. 154(b) by 117 days.

(21) Appl. No.: 16/154,396

(22) Filed: Oct. 8, 2018

(65) Prior Publication Data

US 2019/0106072 A1    Apr. 11, 2019

(30) Foreign Application Priority Data

Oct. 10, 2017   (JP) .................................. 2017-196502

(51) Int. Cl.
   *B62D 25/08*  (2006.01)
   *B62D 21/15*  (2006.01)
   *B60R 19/34*  (2006.01)

(52) U.S. Cl.
   CPC ............ *B60R 19/34* (2013.01); *B62D 21/152* (2013.01); *B62D 25/08* (2013.01); *B62D 25/082* (2013.01)

(58) Field of Classification Search
   CPC ...... B60R 19/34; B62D 25/082; B62D 25/08; B62D 21/152
   See application file for complete search history.

(56) References Cited

U.S. PATENT DOCUMENTS

2012/0248820 A1    10/2012   Yasui et al.

FOREIGN PATENT DOCUMENTS

| DE | 102013208144 A1 | 11/2014 |
| EP | 2921377 A1 | 9/2015 |
| JP | 5357953 B2 | 12/2013 |
| JP | 2015217898 A | 12/2015 |
| WO | 2012156794 A1 | 11/2012 |

*Primary Examiner* — D Glenn Dayoan
*Assistant Examiner* — Melissa Ann Bonifazi
(74) *Attorney, Agent, or Firm* — Alleman Hall Creasman & Tuttle LLP

(57) ABSTRACT

A vehicle body structure includes a frame extending in a vehicle longitudinal direction outside a power train in a vehicle width direction, the power train being mounted on a front portion of a vehicle. The vehicle body structure further includes a load receiving portion expanding outward in the vehicle width direction from a front end of the frame and configured to receive impact load acting upon front collision of the vehicle outside the frame in the vehicle width direction, a cutout portion provided at the front end of the frame and cut out rearwardly from the front end of the frame to leave two side portions, and a connection member connecting the side portions of the cutout portion in the vehicle width direction.

16 Claims, 9 Drawing Sheets

VEHICLE BODY STRUCTURE

CROSS-REFERENCE TO RELATED APPLICATIONS

The application claims priority to Japanese Patent Application No. 2017-196502 filed on Oct. 10, 2017, the entire disclosure of which is hereby incorporated by reference.

BACKGROUND

The technique disclosed in the present specification relates to a vehicle body structure including a frame extending in a vehicle longitudinal direction outside a power train in a vehicle width direction, the power train being mounted on a front portion of a vehicle.

Typically, it has been known that impact load is absorbed by deformation of a frame (a front side frame and/or an extension frame extending from a suspension cross member to a vehicle front side) upon front collision of a vehicle. One form of front collision of the vehicle may include collision with an obstacle outside the front side frame of the vehicle in a vehicle width direction, and such front collision is called "small overlap collision." For such small overlap collision, it has been known that a load receiving portion protruding outward in the vehicle width direction is provided at a portion extending from a front end of the front side frame to the vicinity thereof (see, e.g., Japanese Patent No. 5357953). In this publication, by impact load input to the load receiving portion, a front side frame is moved in a vehicle width direction, and a power unit (a power train) is moved in the vehicle width direction. With this configuration, collision energy is absorbed, and retreating of a front portion of a vehicle body toward a vehicle compartment side is reduced.

SUMMARY

In a case where the above-described load receiving portion is provided at the portion extending from the vehicle-front-side end of the frame to the vicinity thereof, the weight of the frame is increased because such a portion is expanded outward in the vehicle width direction. For this reason, for weight reduction of the frame, a cutout portion cut out from a vehicle-front-side end surface of the frame to a vehicle rear side as viewed in plane might be formed at the end surface.

In addition, upon small overlap collision of the vehicle, the frame might be bent inward in the vehicle width direction by the impact load input to the load receiving portion, and accordingly, might come into contact with the power train. By such contact, a front portion of the vehicle might be moved to a side away from the obstacle in the vehicle width direction such that transfer of the impact load to the inside of a vehicle compartment of the vehicle is reduced.

However, in the case of forming the above-described cutout portion, when the impact load is input to the load receiving portion, there is a probability that the cutout portion expands in the vehicle width direction. When the cutout portion expands in the vehicle width direction, it is difficult to efficiently transfer the impact load input to the load receiving portion to the frame. Specifically, in a case where the front portion of the vehicle is, as described above, moved to the side away from the obstacle in the vehicle width direction upon small overlap collision of the vehicle, if a clearance in the vehicle width direction between the frame and the power train is small, the frame comes into contact with the power train before being sufficiently bent. For this reason, the impact load input to the load receiving portion acts such that a portion outside the cutout portion in the vehicle width direction at the portion extending from the vehicle-front-side end of the frame to the vicinity thereof is separated outward and backward in the vehicle width direction from an inner portion of the cutout portion in the vehicle width direction, and accordingly, the cutout portion more easily expands in the vehicle width direction. As a result, it is more difficult to transfer the impact load input to the load receiving portion to the frame, and it is difficult to move the front portion of the vehicle to the side away from the obstacle in the vehicle width direction.

The technique disclosed herein is intended to provide a vehicle body structure configured such that a cutout portion cut out from a vehicle-front-side end surface of a frame to a vehicle rear side as viewed in plane is formed at the end surface to reduce the weight of the frame and expansion of the cutout portion in a vehicle width direction is reduced upon small overlap collision of a vehicle to efficiently transfer impact load input to a load receiving portion to the frame.

For accomplishing the above-described object, the following vehicle body structure is provided.

The vehicle body structure includes a frame extending in a vehicle longitudinal direction outside a power train in a vehicle width direction, the power train being mounted on a front portion of a vehicle. The vehicle body structure further includes a load receiving portion expanding outward in the vehicle width direction from a front end of the frame and configured to receive impact load acting upon front collision of the vehicle outside the frame in the vehicle width direction, a cutout portion provided at the front end of the frame and cut out rearwardly from the front end of the frame to leave two side portions, and a connection member connecting the side portions of the cutout portion in the vehicle width direction.

With this configuration, the weight of the frame can be reduced by the cutout portion. In addition, both side portions of the cutout portion in the vehicle width direction are connected to each other by the connection member, and therefore, expansion of the cutout portion in the vehicle width direction can be reduced when the impact load is input to the load receiving portion in small overlap collision of the vehicle. Thus, the impact load input to the load receiving portion can be efficiently transferred to the frame.

In one embodiment of the vehicle body structure, the frame is, through a coupling cross member extending in the vehicle width direction, coupled to an opposing frame extending in the vehicle longitudinal direction at the opposite side of the power train from the frame, and a vehicle-front-side opening end of the cutout portion is positioned closer to the vehicle front side with respect to the coupling cross member.

With this configuration, the cutout portion more easily expands in the vehicle width direction when the impact load is input to the load receiving portion, but both side portions of the cutout portion in the vehicle width direction are connected to each other by the connection member. Thus, even in this configuration in which the cutout portion easily expands in the vehicle width direction, expansion of the cutout portion in the vehicle width direction can be reduced.

In another embodiment of the vehicle body structure, the frame is curved to protrude inward in the vehicle width direction at the vehicle rear side of the load receiving portion.

With this configuration, the frame is easily bent inward in the vehicle width direction when the impact load is input to the load receiving portion, and by such bending, the frame can come into contact with the power train. By such contact, the front portion of the vehicle can be moved to a side away from an obstacle in the vehicle width direction. As a result, transfer of the impact load upon small overlap collision of the vehicle to the inside of a vehicle compartment of the vehicle can be reduced. In a case where a clearance in the vehicle width direction between the frame and the power train is small, the frame comes into contact with the power train before being sufficiently bent. For this reason, the impact load input to the load receiving portion acts such that a portion outside the cutout portion in the vehicle width direction at the portion extending from the vehicle-front-side end of the frame to the vicinity thereof is separated outward in the vehicle width direction and backward from an inner portion of the cutout portion in the vehicle width direction, and accordingly, the cutout portion more easily expands in the vehicle width direction. However, both side portions of the cutout portion in the vehicle width direction are connected to each other by the connection member, and therefore, expansion of the cutout portion in the vehicle width direction can be reduced even in the case of the small clearance in the vehicle width direction between the frame and the power train.

In still another embodiment of the vehicle body structure, a set plate provided at a vehicle-rear-side end surface of a crash can is, with a bolt, fastened to the vehicle-front-side end surface of the frame, and the connection member is welded and joined to both side portions of the cutout portion in the vehicle width direction.

With this configuration, the set plate can also reduce, in addition to the connection member, expansion of the cutout portion in the vehicle width direction upon small overlap collision of the vehicle. In this embodiment, the set plate is fastened with the bolt, and therefore, is auxiliary. Basically, the welded and joined connection member reduces expansion of the cutout portion in the vehicle width direction.

In the vehicle body structure, the connection member is preferably provided in the vicinity of a vehicle-front-side opening end of the cutout portion.

This can suppress the substantially entirety of the cutout portion in the vehicle longitudinal direction from expanding in the vehicle width direction upon small overlap collision of the vehicle, and the impact load input to the load receiving portion can be more efficiently transferred to the frame.

DETAILED DESCRIPTION

Hereinafter, an exemplary embodiment will be described in detail based on the drawings.

Figure 1:
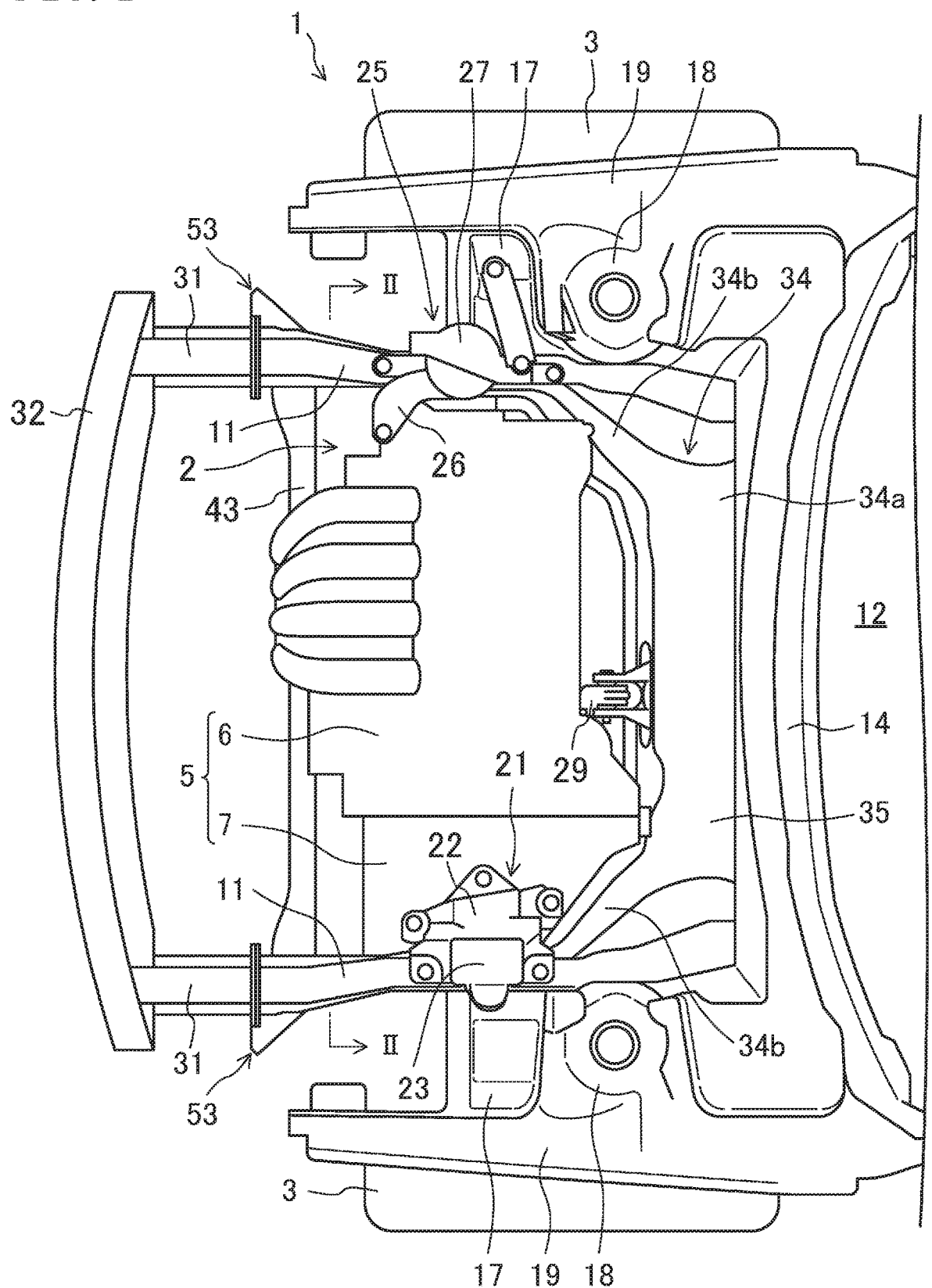
FIG. 1 is a plan view of a main portion of a front portion of a vehicle to which a vehicle body structure according to an exemplary embodiment is applied.
Figure 2:
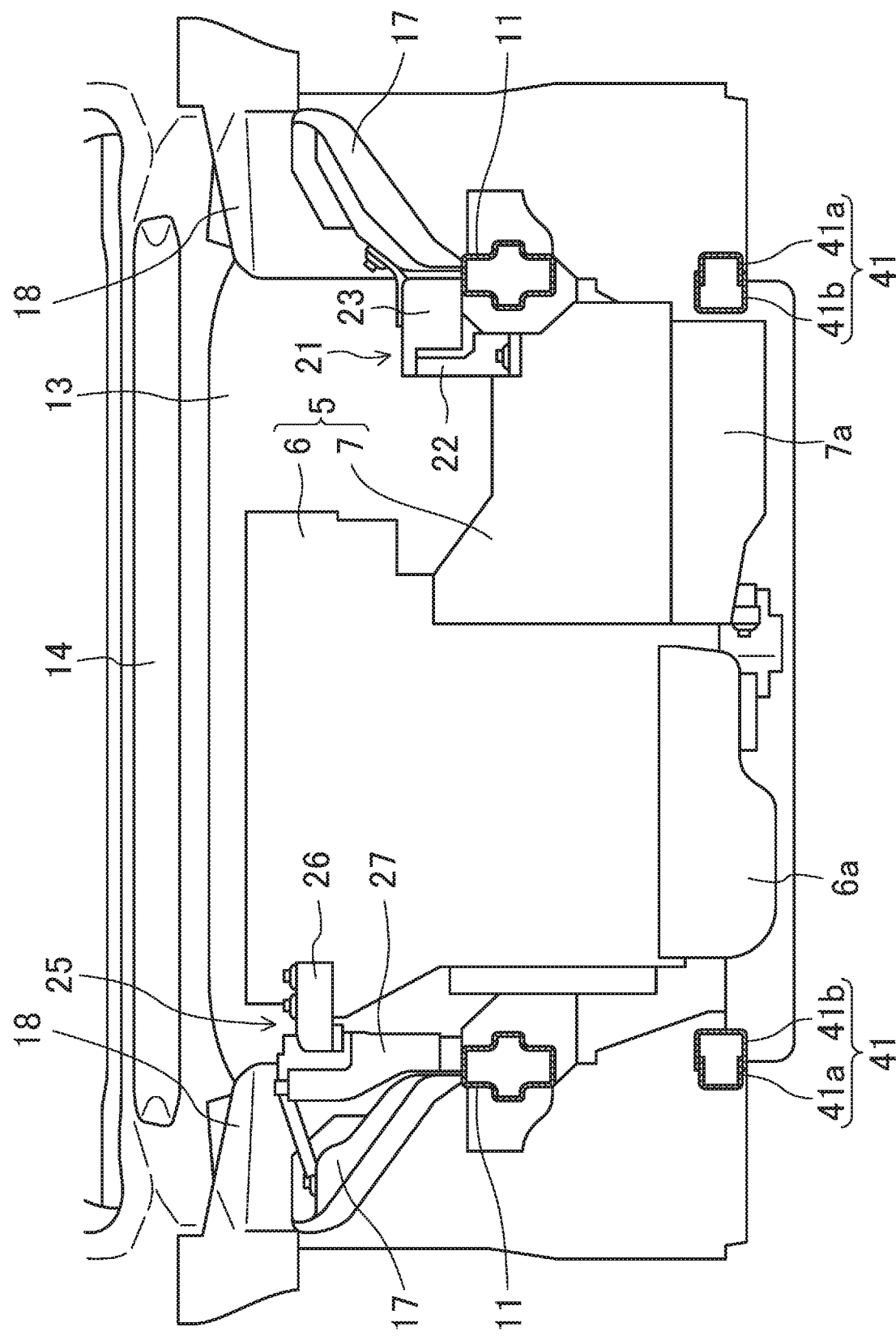
FIG. 2 is a sectional view cut along an II-II line of FIG. 1.
Figure 3:
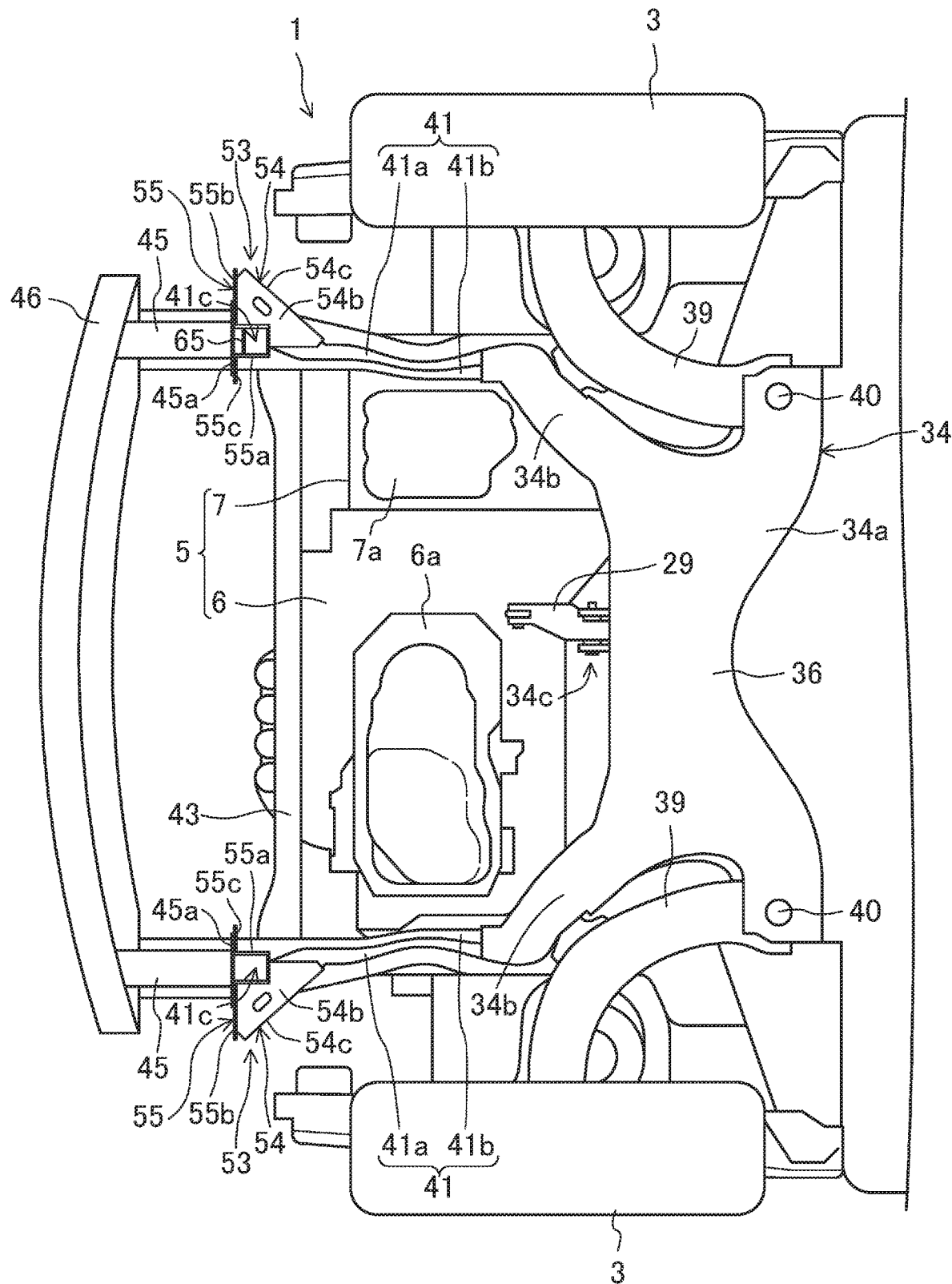
FIG. 3 is a bottom view of the front portion of the vehicle from below.

FIGS. 1 to 3 illustrate a main portion of a front portion of a vehicle 1 to which a vehicle body structure according to the exemplary embodiment is applied. In an engine room 2 at the front portion of the vehicle 1, a power train 5 configured to drive right and left front wheels 3 of the vehicle 1 is arranged. The power train 5 includes an engine 6 and a transmission 7 to which torque (power) generated by the engine 6 is input. Hereinafter, the front, rear, right, left, top, and bottom of the vehicle 1 will be each simply referred to as "front, rear, right, left, top, and bottom."

The engine 6 and the transmission 7 are arranged in a vehicle width direction (a right-to-left direction) between right and left front side frames 11 in a pair as described above. In the present exemplary embodiment, the engine 6 is positioned at the right of the transmission 7. A bottom end portion of the engine 6 includes an oil pan 6a (see FIG. 3).

The right and left front side frames 11 formed in a pair with a substantially rectangular closed sectional shape and extending in a vehicle longitudinal direction are each arranged at both end portions of the engine room 2 in the vehicle width direction. Moreover, a dash panel 13 (see FIG. 2) separating the engine room 2 and a vehicle compartment 12 is provided at a rear end portion of the engine room 2. A cowl member 14 is joined to a top end portion of the dash panel 13. Rear end portions of right and left apron reinforcement members 19 extending in the vehicle longitudinal direction are each coupled to both end portions of the cowl member 14 in the vehicle width direction.

Wheel house panels 17 and suspension towers 18 are each provided outside the right and left front side frames 11 in the vehicle width direction. Each wheel house panel 17 is formed in an arc shape to cover the top side of the front wheel 3, and a front wheel house is formed inside such an arc. Bottom end portions of the right and left suspension towers 18 are each fixed to the right and left front side frames 11, and top end portions of the right and left suspension towers 18 are each fixed to the right and left apron reinforcement members 19.

The power train 5 is elastically supported by the pair of right and left front side frames 11 through a right mount device 25 and a left mount device 21 at both end portions of the power train 5 such that a longitudinal direction of the power train 5 is along the vehicle width direction. The left mount device 21 has a power train side coupling member 22 coupled to a top portion of a left end portion of the transmission 7, a vehicle body side coupling member 23 coupled to the left front side frame 11 and the left wheel house panel 17, and a rubber bush (not shown) arranged between these coupling members 22, 23. By the left mount device 21, the top portion of the left end portion of the transmission 7 is elastically supported by the left front side frame 11. Moreover, the right mount device 25 has a power train side coupling member 26 coupled to a top portion of a right end portion of the engine 6, a vehicle body side coupling member 27 coupled to the right front side frame 11 and the right wheel house panel 17, and a rubber bush (not shown) arranged between these coupling members 26, 27. By the right mount device 25, the top portion of the right end portion of the engine 6 is elastically supported by the right front side frame 11.

Crash cans 31 are each provided on front end surfaces of the right and left front side frames 11, and front end surfaces of these right and left crash cans 31 are each fixed to both right and left end portions of bumper beams 32 extending in the vehicle width direction.

Figure 4:
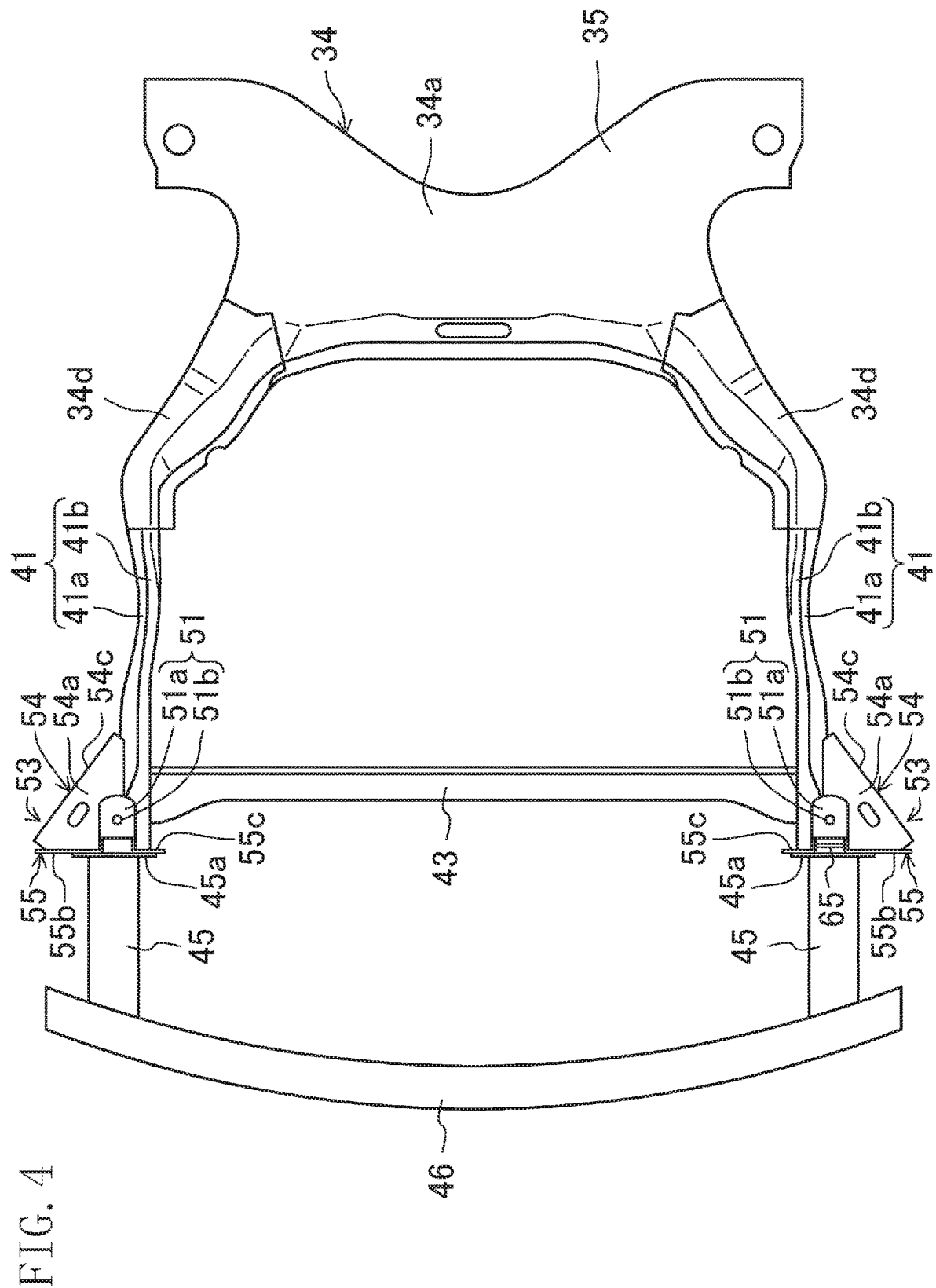
FIG. 4 is a plan view of a body portion and right and left front extension portions of a suspension cross member, right and left extension frames, a coupling cross member, crash cans, and a stiffener of the vehicle.

As illustrated in FIGS. 3 and 4, a suspension cross member 34 extending in the vehicle width direction below the right and left front side frames 11 is arranged slightly at the rear side of the suspension towers 18. The suspension cross member 34 includes a top member 35 and a bottom member 36 joined to each other at peripheral edge portions.

The suspension cross member 34 has a body portion 34a extending in the vehicle width direction and front extension portions 34b extending inclined outward in the vehicle width direction from front edges of both right and left end portions of the body portion 34a toward the front side. The right and left front extension portions 34b are formed in a substantially rectangular closed sectional shape by the top member 35 and the bottom member 36.

The right and left front wheels 3 are supported by the body portion 34a of the suspension cross member 34 through right and left suspension arms 39 (lower arms) forming part of a front wheel suspension. The right and left front wheels 3 are each supported by one end portions (outer end portions in the vehicle width direction) of the right and left suspension arms 39, and the other end portions (inner end portions in the vehicle width direction) of the right and left suspension arms 39 are each supported at both right and left end portions of a rear portion of the body portion 34a through rubber bushes by shafts 40 (see FIG. 3) extending in a top-to-bottom direction. Although not shown in the figure, middle portions of the suspension arms 39 in a longitudinal direction thereof are each supported at the right and left front extension portions 34b through rubber bushes by shafts extending in the vehicle longitudinal direction.

Top extension portions (not shown) extending upward are each provided on top surfaces of the right and left front extension portions 34b, and top end portions of these right and left top extension portions are each fixed to bottom surfaces of the right and left front side frames 11.

In the vicinity of the center of the body portion 34a of the suspension cross member 34 in the vehicle width direction, a torque rod support portion 34c is provided to rotatably support, about an axis extending in the vehicle width direction, a torque rod 29 provided at a portion of a bottom surface of the engine 6 in the vicinity of the transmission 7. By elastic supporting of the power train 5 at both end portions thereof in the vehicle width direction by the right and left mount devices 25, 21, the entirety of the power train 5 rotates (swings) about the axis extending in the vehicle width direction. However, the torque rod 29 restricts excessive rotation of the entirety of the power train 5 about the above-described axis.

Extension frames 41 formed in a substantially rectangular closed sectional shape and extending in the vehicle longitudinal direction at positions below the right and left front side frames 11 are linked to front end portions of the right and left front extension portions 34b. Each of the right and left extension frames 41 includes an outer member 41a positioned outside in the vehicle width direction, and an inner member 41b positioned inside in the vehicle width direction. The outer member 41a and the inner member 41b are in a substantially U-shaped sectional shape, and are welded and joined with openings of these U-shapes facing each other. The right and left extension frames 41 are at the substantially same position as that of the right and left front side frames 11 in the vehicle width direction.

A rear end portion of each extension frame 41 is welded and joined to a corresponding one of the front extension portions 34b (the top member 35 and the bottom member 36) with the rear end portion being inserted into the closed section of the corresponding one of the front extension portions 34b. That is, the rear end portion of each extension frame 41 is welded and joined with the rear end portion overlapping with the suspension cross member 34 in the vehicle longitudinal direction.

A crash can 45 similar to the crash can 31 provided at a front end of each front side frame 11 is provided on a front end surface of each extension frame 41. A set plate 45a is provided on a rear end surface of each crash can 45, and is fastened and fixed to the front end surface of each extension frame 41 (specifically, an outer portion 55b and an inner portion 55c of a later-described front member 55) with multiple (three in the present exemplary embodiment) bolts 60 (illustrated only in FIGS. 5 and 6).

The front end surfaces of the right and left crash cans 45 are, at positions below the bumper beams 32, each fixed to both right and left end portions of a stiffener 46 extending in the vehicle width direction. The stiffener 46 is configured to contact bottom portions of the legs of a pedestrian colliding with a front surface of the vehicle 1 to sweep these legs, thereby causing the pedestrian to fall over a bonnet of the vehicle 1. This prevents occurrence of an injury of the legs of the pedestrian, such as bone fracture, as much as possible. Note that front portions of the bumper beams 32 and the stiffener 46 are covered with a not-shown front bumper.

Figure 5:
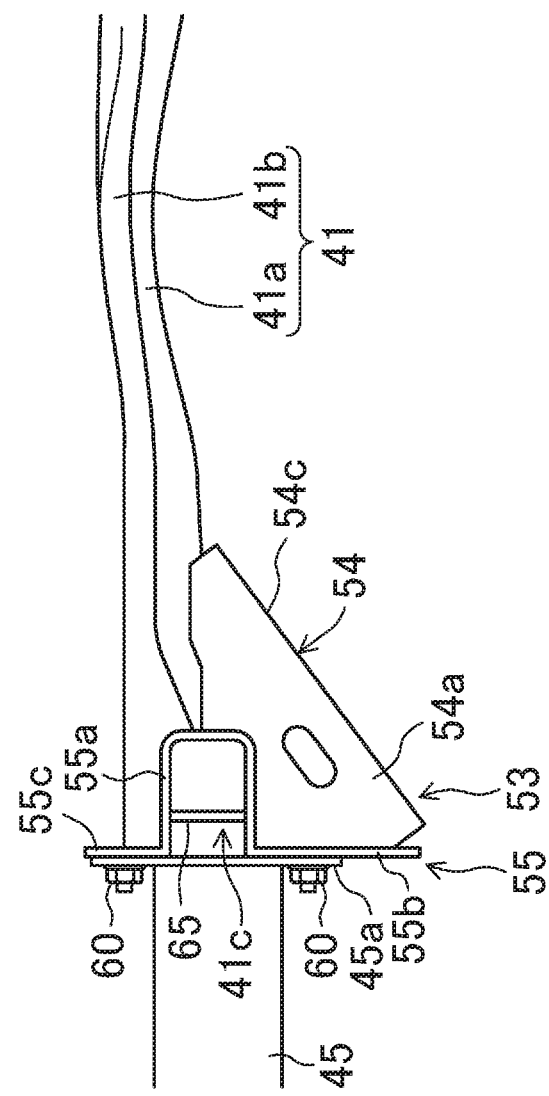
FIG. 5 is a plan view of the left extension frame whose front end surface is fastened to the crash can, except for a fixing member.
Figure 6:
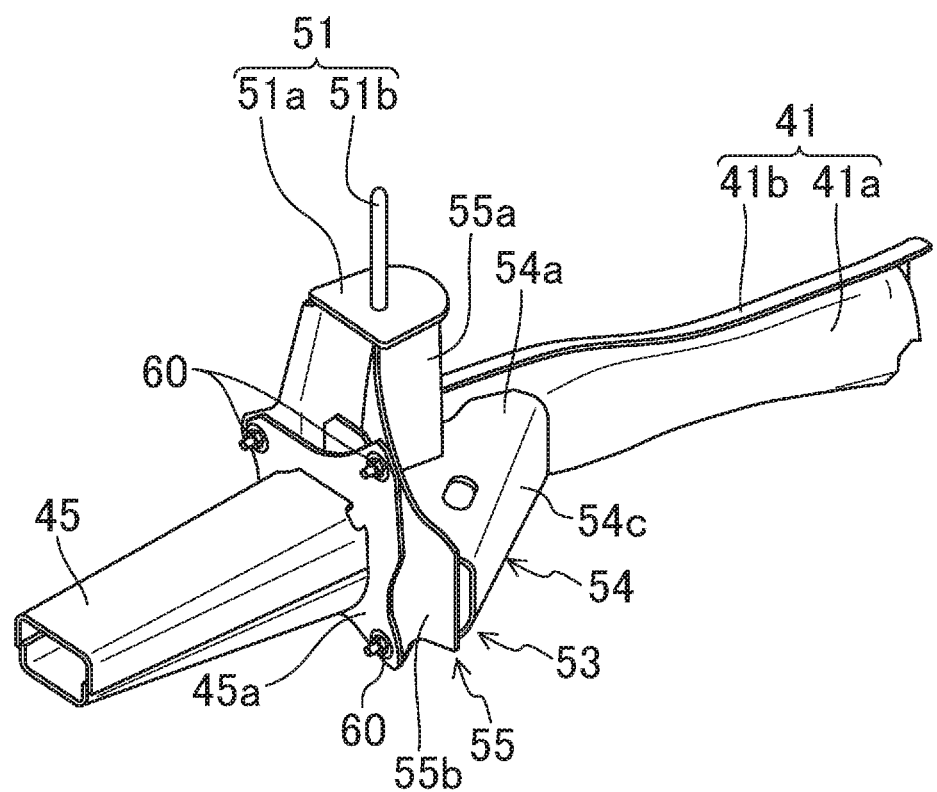
FIG. 6 is a perspective view of the left extension frame.
Figure 7:
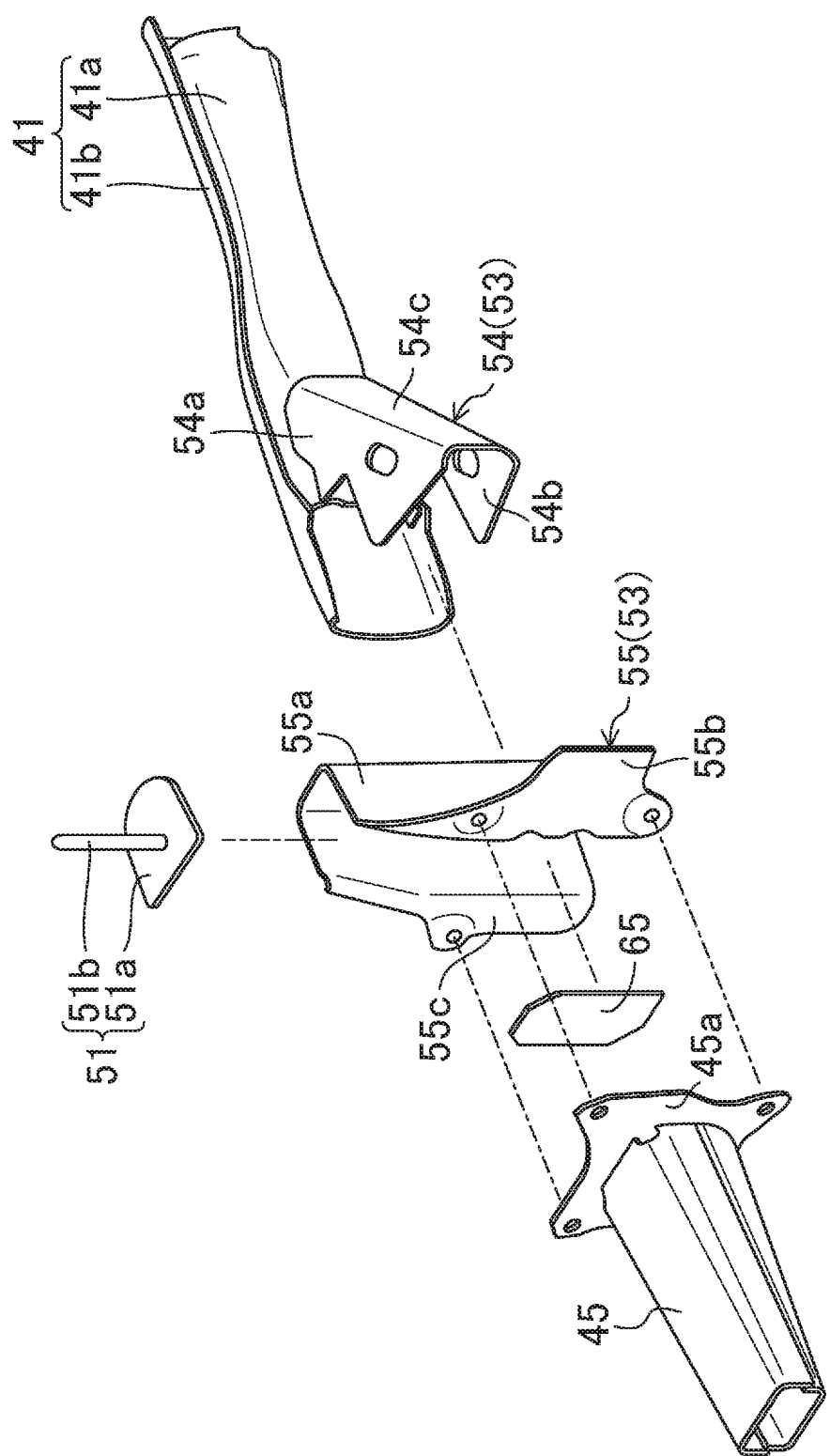
FIG. 7 is an exploded perspective view of a configuration of a cutout portion of the left extension frame.

As illustrated in FIGS. 3 and 5, a cutout portion 41c cut out rearwardly in a rectangular shape from the front end of each extension frame 41 to leave two side portions as viewed in plane is formed at the front end surface of each extension frame 41. The cutout portion 41c is for weight reduction of the extension frame 41.

The front end portions of the right and left extension frames 41 are coupled to each other by a coupling cross member 43 extending in the vehicle width direction. The body portion 34a and the right and left front extension portions 34b of the suspension cross member 34, the right and left extension frames 41, and the coupling cross member 43 form a perimeter frame in a substantially rectangular shape as viewed in plane.

At a portion extending from a front end of each extension frame 41, a load receiving portion 53 expanded outward in the vehicle width direction from the front end of the extension frame 41 and configured to receive impact load upon front collision of the vehicle 1 outside the extension frame 41 in the vehicle width direction (i.e., outside the front side frame 11 in the vehicle width direction) is provided. That is, when so-called small overlap collision occurs, i.e., a portion of the front surface (specifically, the front bumper) of the vehicle 1 outside the extension frame 41 in the vehicle width direction and an obstacle 71 (see FIGS. 8 and 9) collide with each other, such impact load is input to the load receiving portion 53.

As illustrated in FIGS. 3 to 7, the load receiving portion 53 of each extension frame 41 includes a plate-shaped body member 54 having a substantially U-shaped section cut at a plane along the vehicle width direction and bent such that an opening of the U-shape faces inward in the vehicle width direction, and part (the later-described outer portion 55b) of the front member 55 forming the front end surface of the extension frame 41.

The body member 54 has a top portion 54a welded and joined to a top surface of the extension frame 41, and a bottom portion 54b (see FIG. 3) welded and joined to a bottom surface of the extension frame 41 with the bottom portion 54b facing the top portion 54a. The top portion 54a and the bottom portion 54b are in a substantially triangular shape having the same size as viewed in plane, and have front edges extending straight outward in the vehicle width direction and rear edges extending inclined inward in the vehicle width direction from protruding tip ends of the front edges to the rear side. The rear edges of the top portion 54a and the bottom portion 54b are coupled to each other by a rear portion 54c formed integrally with the top portion 54a and the bottom portion 54b. The body member 54 forms part of the extension frame 41.

The front member 55 has a cutout formation portion 55a forming both side portions of the cutout portion 41c in the vehicle width direction and a rear end portion of the cutout portion 41c and formed in a substantially U-shape as viewed in plane, and the outer portion 55b and the inner portion 55c each extending outward and inward from both end portions of the U-shaped cutout formation portion 55a in the vehicle width direction. That is, the front member 55 is in a hat shape as viewed in plane. A front opening end (i.e., an opening end of the U-shaped cutout formation portion 55a) of the cutout portion 41c, the outer portion 55b, and the inner portion 55c are positioned closer to the front side with respect to the coupling cross member 43.

The outer portion 55b forms a front portion of the load receiving portion 53, and is welded and joined to a front end surface of the body member 54 (specifically, front edges of the top portion 54a and the bottom portion 54b). The inner portion 55c is welded and joined to a front end surface of the inner member 41b of the extension frame 41. The set plate 45a of the crash can 45 is fastened to the outer portion 55b and the inner portion 55c with the bolts 60. The cutout formation portion 55a is welded and joined to both of the body member 54 and the inner member 41b.

The cutout formation portion 55a extends upward of top surfaces of the outer member 41a and the inner member 41b of the extension frame 41, and a fixing member 51 for fixing to the front side frame 11 positioned above the extension frame 41 is provided at a top end of the cutout formation portion 55a. The fixing member 51 has a plate material 51a welded and joined to the top end of the cutout formation portion 55a to close a top opening of the cutout portion 41c, and a pin member 51b extending upward to allow insertion from the plate material 51a into the front side frame 11 and fixed to a member provided inside the front side frame 11. With this configuration, each extension frame 41 is fixed to a corresponding one of the front side frames 11 through the front member 55 and the fixing member 51.

Each extension frame 41 is curved to protrude inward in the vehicle width direction at the rear side of the load receiving portion 53. This is because the extension frame 41 is easily bent inward in the vehicle width direction when the impact load is input to the load receiving portion 53.

In the present exemplary embodiment, the left extension frame 41 is equivalent to a frame included in the vehicle body structure of the present invention, and the right extension frame 41 is equivalent to an opposing frame extending in the vehicle longitudinal direction at the opposite side of the power train 5 from the left extension frame 41. Hereinafter, a configuration of the left extension frame 41 and deformation of the left extension frame 41 upon small overlap collision at a left portion of the front surface of the vehicle 1 will be described.

The left extension frame 41 extends in the vehicle longitudinal direction outside (the left side) the power train 5 (the transmission 7) in the vehicle width direction. A case bottom end portion 7a of the transmission 7 is at the same height position as that of the left extension frame 41 (see FIG. 2). A clearance in the vehicle width direction between the left extension frame 41 and the power train 5 (the case bottom end portion 7a) is smaller than a clearance in the vehicle width direction between the right extension frame 41 and the power train 5 (the oil pan 6a at the same height position as that of the right extension frame 41).

In the vicinity of the front opening end in the cutout portion 41c of the left extension frame 41, a plate-shaped connection member 65 connecting both side portions of the cutout portion 41c in the vehicle width direction (two surfaces of the cutout formation portion 55a facing each other in the vehicle width direction) is provided. Both end portions of the connection member 65 in the vehicle width direction are each welded and joined to both side portions of the cutout portion 41c in the vehicle width direction. As described later, the connection member 65 is a member configured to reduce expansion of the cutout portion 41c in the vehicle width direction (i.e., an increase in an interval between the side portions of the cutout portion 41c in the vehicle width direction) when the impact load is input to the load receiving portion 53. Note that in the present exemplary embodiment, no connection member 65 is provided at the right extension frame 41.

When small overlap collision with the obstacle 71 occurs at the left portion of the front surface of the vehicle 1, the impact load is, from the front side, input to the load receiving portion 53 of the left extension frame 41. Accordingly, pressing force for inward pressing in the vehicle width direction acts on a portion of the left extension frame 41 provided with the load receiving portion 53. By such pressing force, the left extension frame 41 is bent inward in the vehicle width direction.

Figure 8:
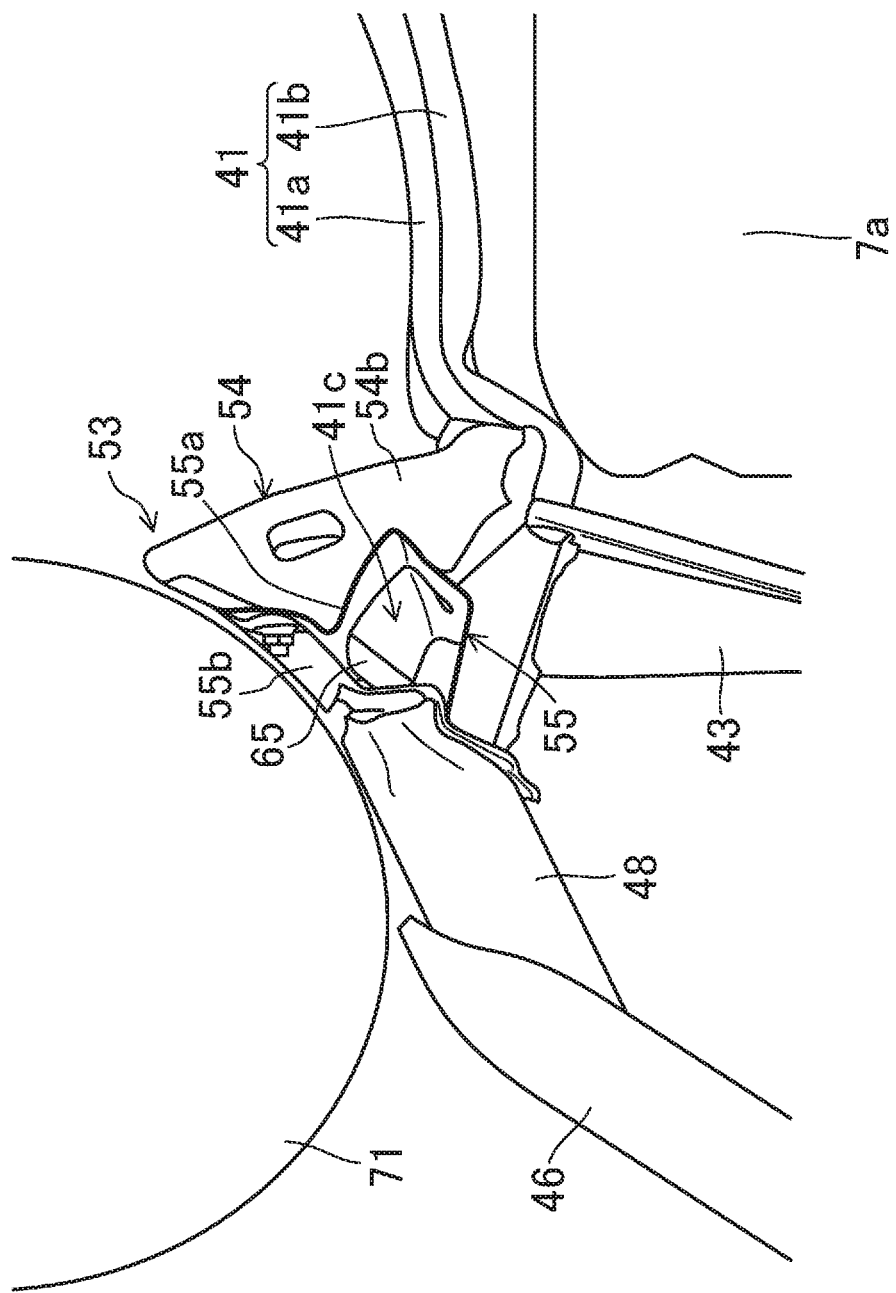
FIG. 8 is a schematic bottom view of a state of deformation of the left extension frame when small overlap collision with an obstacle occurs at a left portion of a front surface of the vehicle.

Unlike the right extension frame 41, the left extension frame 41 has a smaller clearance from the power train 5 (the case bottom end portion 7a of the transmission 7) in the vehicle width direction. Thus, the left extension frame 41 contacts the power train 5 (a front end portion of the case bottom end portion 7a) before being sufficiently bent. Consequently, as illustrated in FIG. 8, in a state in which a portion of the left extension frame 41 at the same position in the vehicle longitudinal direction as that of the front end portion of the case bottom end portion 7a contacts the case bottom end portion 7a, a portion of the left extension frame 41 at the front side of the case bottom end portion 7a is pushed inward in the vehicle width direction by the pressing force. The coupling cross member 43 is curved to a certain extent by such pressing, but the portion of the left extension frame 41 at the front side of the case bottom end portion 7a is not further pushed inward in the vehicle width direction by the coupling cross member 43.

In this state, when the obstacle 71 attempts to further retreat relative to the vehicle 1, a portion outside the cutout portion 41c in the vehicle width direction at the portion extending from the front end of the left extension frame 41 to the vicinity thereof attempts, by the impact load input to the load receiving portion 53, to rotate backward about a base point, i.e., a contact portion of the left extension frame 41 with the power train 5 or a coupling portion of the left extension frame 41 to the coupling cross member 43. By such rotation, the portion outside the cutout portion 41c in the vehicle width direction at the portion extending from the front end of the left extension frame 41 to the vicinity thereof is separated outward in the vehicle width direction and backward from a portion inside the cutout portion 41c in the vehicle width direction (i.e., the cutout portion 41c expands in the vehicle width direction).

Due to these reasons, if no connection member 65 is provided inside the cutout portion 41c of the left extension frame 41, the cutout portion 41c expands in the vehicle width direction, and therefore, it is difficult to transfer the impact load input to the load receiving portion 53 to the left extension frame 41.

Figure 9:
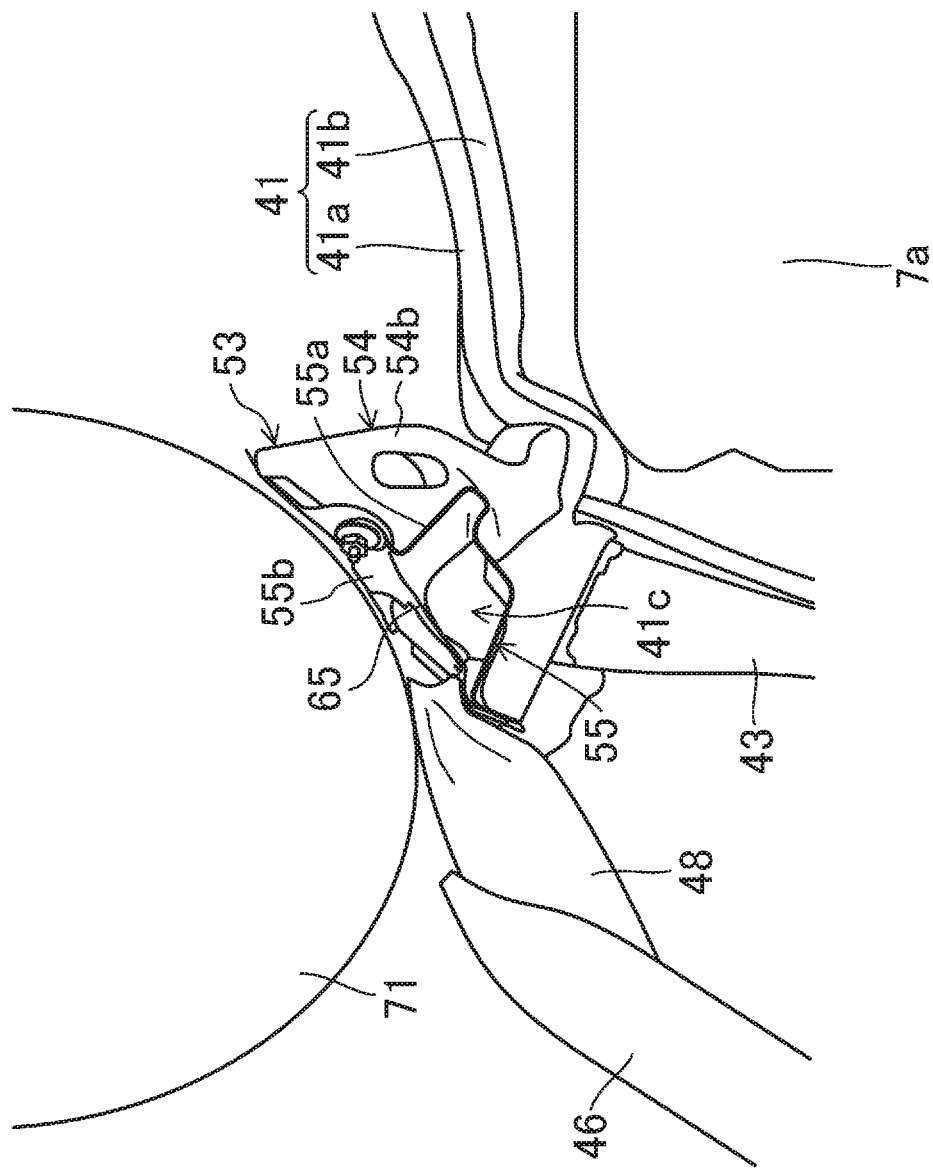
FIG. 9 is a view corresponding to FIG. 8 when the obstacle further retreats relative to the vehicle from FIG. 8.

On the other hand, in the present exemplary embodiment, the connection member 65 is provided inside the cutout portion 41c of the left extension frame 41. Thus, as illustrated in FIG. 9, even when the obstacle 71 further retreats relative to the vehicle 1, the cutout portion 41c does not greatly expand in the vehicle width direction. Thus, the impact load input to the load receiving portion 53 is, as the pressing force, efficiently transferred to the left extension frame 41. The pressing force is transferred to the right extension frame 41 through the power train 5. With this configuration, the impact load input to the load receiving portion 53 from the vehicle front side can be converted into load in the vehicle width direction. As a result, the orientation of the vehicle can be changed such that the front portion of the vehicle 1 moves to a side (the right side in the present exemplary embodiment) away from the obstacle 71 in the vehicle width direction. Consequently, transfer of the impact load upon small overlap collision of the vehicle 1 into the vehicle compartment of the vehicle 1 can be reduced.

The present invention is not limited to the above-described exemplary embodiment, and substitutions can be made without departing from the gist of the claims.

For example, in the above-described exemplary embodiment, the left extension frame 41 is the frame included in the vehicle body structure of the present invention. Instead of or in addition to the left extension frame 41, the right extension frame 41 may be used as such a frame. In this case, both side portions of the cutout portion 41c of the right extension frame 41 in the vehicle width direction are connected to each other by the connection member 65.

Moreover, the above-described frame is not limited to the extension frame 41, and may be at least one of the right and left front side frames 11. In this case, the load receiving portion and the cutout portion are, as in the extension frame 41, provided at least one of the right and left front side frames 11, and both side portions of the cutout portion in the vehicle width direction are connected to each other by the connection member.

The above-described exemplary embodiment has been set forth merely as an example, and the scope of the present invention shall not be interpreted in a limited manner. The scope of the present invention is defined by the claims, and variations and changes falling within an equivalent scope of the claims are all included in the scope of the present invention.

What is claimed is:

1. A vehicle body structure comprising:
   a frame extending in a vehicle longitudinal direction outside a power train in a vehicle width direction, the power train being mounted on a front portion of a vehicle,
   a load receiving portion expanding outward in the vehicle width direction from a front end of the frame and configured to receive impact load acting upon front collision of the vehicle outside the frame in the vehicle width direction,
   a cutout portion provided at the front end of the frame and cut out rearwardly from the front end of the frame to leave two side portions, and
   a connection member connecting the side portions of the cutout portion in the vehicle width direction.

2. The vehicle body structure according to claim 1, wherein
   the frame is, through a coupling cross member extending in the vehicle width direction, coupled to an opposing frame extending in the vehicle longitudinal direction at an opposite side of the power train from the frame, and
   a vehicle-front-side opening end of the cutout portion is positioned closer to a vehicle front side with respect to the coupling cross member.

3. The vehicle body structure according to claim 1, wherein
   the frame is curved to protrude inward in the vehicle width direction at the vehicle rear side of the load receiving portion.

4. The vehicle body structure according to claim 2, wherein
   the frame is curved to protrude inward in the vehicle width direction at the vehicle rear side of the load receiving portion.

5. The vehicle body structure according to claim 1, wherein
   a set plate provided at a vehicle-rear-side end surface of a crash can is, with a bolt, fastened to the vehicle-front-side end surface of the frame, and
   the connection member is welded and joined to both side portions of the cutout portion in the vehicle width direction.

6. The vehicle body structure according to claim 2, wherein
   a set plate provided at a vehicle-rear-side end surface of a crash can is, with a bolt, fastened to the vehicle-front-side end surface of the frame, and
   the connection member is welded and joined to both side portions of the cutout portion in the vehicle width direction.

7. The vehicle body structure according to claim 3, wherein
   a set plate provided at a vehicle-rear-side an end surface of a crash can is, with a bolt, fastened to the vehicle-front-side end surface of the frame, and
   the connection member is welded and joined to both side portions of the cutout portion in the vehicle width direction.

8. The vehicle body structure according to claim 4, wherein
   a set plate provided at a vehicle-rear-side end surface of a crash can is, with a bolt, fastened to the vehicle-front-side end surface of the frame, and
   the connection member is welded and joined to both side portions of the cutout portion in the vehicle width direction.

9. The vehicle body structure according to claim 1, wherein
   the connection member is provided in a vicinity of a vehicle-front-side opening end of the cutout portion.

10. The vehicle body structure according to claim 2, wherein
    the connection member is provided in a vicinity of the vehicle-front-side opening end of the cutout portion.

11. The vehicle body structure according to claim 3, wherein
   the connection member is provided in a vicinity of a vehicle-front-side opening end of the cutout portion.

12. The vehicle body structure according to claim 4, wherein
   the connection member is provided in a vicinity of the vehicle-front-side opening end of the cutout portion.

13. The vehicle body structure according to claim 5, wherein
   the connection member is provided in a vicinity of a vehicle-front-side opening end of the cutout portion.

14. The vehicle body structure according to claim 6, wherein
   the connection member is provided in a vicinity of the vehicle-front-side opening end of the cutout portion.

15. The vehicle body structure according to claim 7, wherein
   the connection member is provided in a vicinity of a vehicle-front-side opening end of the cutout portion.

16. The vehicle body structure according to claim 8, wherein
   the connection member is provided in a vicinity of the vehicle-front-side opening end of the cutout portion.

* * * * *